No. 808,779. PATENTED JAN. 2, 1906.
B. P. & F. I. REMY.
ELECTRIC GENERATOR.
APPLICATION FILED MAY 27, 1905.
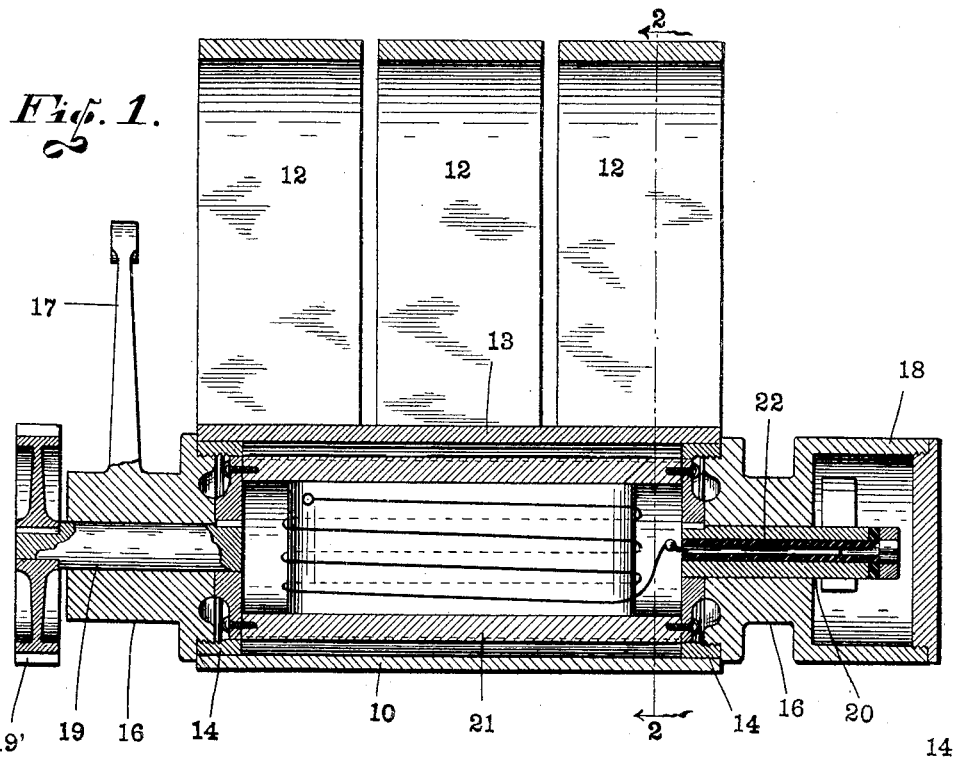
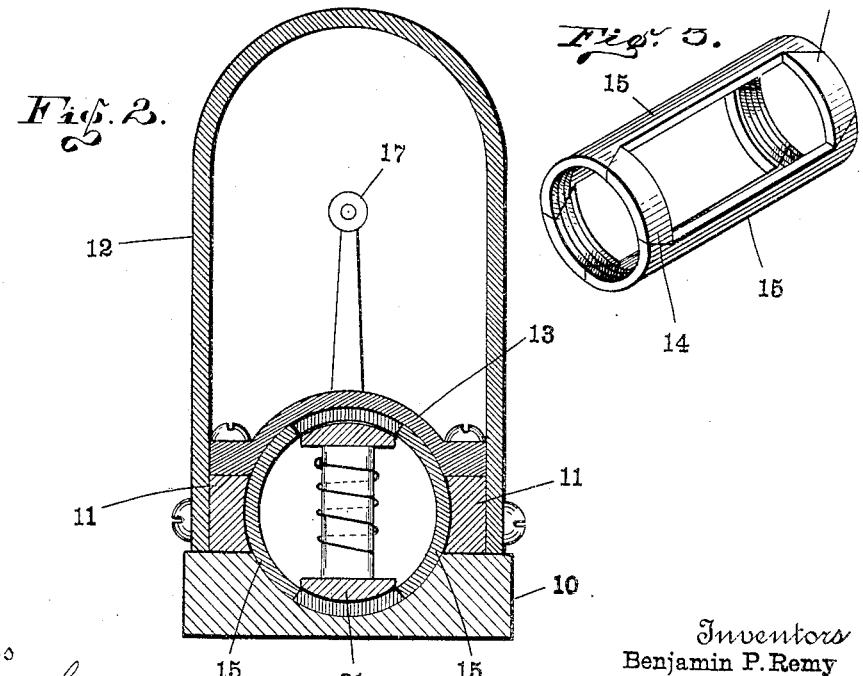
Witnesses
Adelaide Kearns
J. A. Walsh
Inventors
Benjamin P. Remy
Frank I. Remy
By Bradford Hood
Attorneys

UNITED STATES PATENT OFFICE.

BENJAMIN P. REMY AND FRANK I. REMY, OF ANDERSON, INDIANA, ASSIGNORS TO REMY ELECTRIC COMPANY, OF ANDERSON, INDIANA, A CORPORATION OF INDIANA.

ELECTRIC GENERATOR.

No. 808,779.      Specification of Letters Patent.      Patented Jan. 2, 1906.

Application filed May 27, 1905. Serial No. 262,668.

*To all whom it may concern:*

Be it known that we, BENJAMIN P. REMY and FRANK I. REMY, citizens of the United States, residing at Anderson, in the county of Madison and State of Indiana, have invented certain new and useful Improvements in Electric Generators, of which the following is a specification.

The object of our invention is to produce a compact electric-generator structure in which the field may be advanced or retracted with relation to the armature in order to retard or advance the current-wave.

The accompanying drawings illustrate our invention as applied to a magneto-generator.

Figure 1 is an axial section; Fig. 2, a sectional view on line 2 2 of Fig. 1, and Fig. 3 a perspective detail of the shifting poles.

In the drawings, 10 indicates a suitable base, to which are secured the stationary poles 11 11 and magnets 12, the poles 11 being shown as connected by an intermediate non-magnetic arch 13 for a purpose which will appear. Mounted between the poles 11 are two annular segmental shifting poles 15, which at their ends are connected by non-magnetic segments 14. The non-magnetic segments 14 and adjacent ends of the shifting poles 15 are threaded in order to receive journal-bearings 16. Attached to one of the bearings 16 is a shifting lever 17, and to the other bearing is attached a collector 18. Journaled in one of the bearings 16 is a shaft 19, to which a driving element 19' is attached, and journaled in the other bearing 16 is a shaft 20. These two shafts are attached to the opposite ends of the armature 21, which is mounted within the annular poles 15 to either rotate or oscillate. In the drawings we show an alternating-current generator, and hence the shaft 20 is hollow and is connected to the grounded side of the armature-winding, while a terminal 22 passes through the hollow shaft 20 and is connected to the other side of the armature-winding in the usual well-known manner. By this construction the shifting poles 15 15 may be shifted angularly within the stationary poles 11, so as to advance or retract the field with relation to the armature 21.

We are aware that it is common to advance or retract the field with relation to the armature by swinging the entire structure—*i. e.*, the magnets and pole-pieces—angularly with relation to the armature; but such construction is expensive and undesirable. It is to be understood that the generator may be of any desired type without departing from our invention.

We claim as our invention—

In an electric generator, the combination, with stationary poles, of a pair of annular segmental poles journaled within said stationary poles and provided at the ends with journal-bearings, an armature mounted within said annular poles and having shaft-sections journaled and supported in the journal-bearings of the annular poles, means by which the armature may be angularly moved within the annular poles, and means by which the annular poles may be shifted within the stationary poles.

In witness whereof we have hereunto set our hands and seals, at Anderson, Indiana, this 24th day of May, A. D. 1905.

BENJAMIN P. REMY. [L. S.]
    FRANK I. REMY.    [L. S.]

Witnesses:
    MAE M. MILLER,
    W. R. POLAND.